United States Patent [19]

Feldkämper

[11] 4,258,267

[45] Mar. 24, 1981

[54] METHOD AND APPARATUS FOR TESTING THE BASE FOLDS OF OPEN AND FINISHED BASES FORMED ON TUBE SECTIONS

[75] Inventor: Richard Feldkämper, Lengerich, Fed. Rep. of Germany

[73] Assignee: Windmoller & Holscher, Lengerich, Fed. Rep. of Germany

[21] Appl. No.: 12,494

[22] Filed: Feb. 15, 1979

[30] Foreign Application Priority Data

Feb. 23, 1978 [DE] Fed. Rep. of Germany ....... 2807842

[51] Int. Cl.[3] .............................................. G01N 21/86

[52] U.S. Cl. ..................................... 250/560; 356/386

[58] Field of Search ........................... 250/223 R, 560; 356/376, 383, 384, 385, 386, 381

[56] References Cited

U.S. PATENT DOCUMENTS

| | | | |
|---|---|---|---|
| 3,549,890 | 12/1970 | Keller | 250/209 |
| 3,621,266 | 11/1971 | Akuta et al. | 250/560 |
| 4,064,534 | 12/1977 | Chen et al. | 250/560 |
| 4,166,029 | 8/1979 | Rhotert | 250/560 |

*Primary Examiner*—David C. Nelms
*Attorney, Agent, or Firm*—Fleit & Jacobson

[57] ABSTRACT

In the production of sacks or bags provided with soldered bases, the correct folding of the bases is verified while the bags are being successively conveyed transversely to their longitudinal axes and while they are in a flattened condition with each folded base perpendicular to the remainder of the bag. Verification is effected by photocells activated by a cam plate of the bag-making machine. The photocells are electrically connected to circuits which compare certain dimensions of the bases with desired values therefor, a defective bag destined to be eliminated being indicated by a departure from the desired value.

23 Claims, 5 Drawing Figures

METHOD AND APPARATUS FOR TESTING THE BASE FOLDS OF OPEN AND FINISHED BASES FORMED ON TUBE SECTIONS

The invention relates to a method of testing the base folds of bases formed on tube sections during the production of sacks or bags in which the tube sections are transported in a transverse position, as well as an apparatus for performing the method.

In an apparatus known from DE-PS 16 11 647 for detecting and separating sacks having incorrect base folds, two groups of photocells responding to markings or folded edges of the bases are provided, of which one tests the leading and the other the trailing sides of the bases and which are activated at the appropriate instants of testing by photoconductor cells responding to the leading or trailing sack edge of the transversely conveyed bases as viewed in the direction of transporting. With the known apparatus, it is not only difficult to detect those folded edges which do not form outer edges of the flat sack workpiece with reflection photocells if the sack workpieces are not additionally provided with well-reflecting markings but faultless sacks are also eliminated as being defective if they assume an oblique position, which is often unavoidable.

It is the problem of the present invention to provide an efficient and reliably operative method for testing and eliminating defective base folds.

According to the invention, this problem is solved in a method of the aforementioned kind in that for controlling parts of the leading or trailing edges or folded edges of the as yet open or closed bases the latter are placed perpendicular to the flat tube sections, the length of the bases is measured at a predetermined spacing from the tube section parallel thereto, the measured length is compared with the desired value thereof, and the appropriate sack is eliminated if the measurement differs from the desired value. According to the method of the invention, starting with the leading and trailing edges of the bases for the correct folds, characteristic distances are measured in the conveying direction, it being possible reliably and accurately to detect the start and end of the measurement by reason of the bases being placed perpendicular to the flat tube sections. Since testing is performed on the bases perpendicular to the tube sections which are conveyed transversely, only small errors are produced even if the tube sections have a larger oblique position and these errors should usually fall within the permitted tolerances.

Preferably, the length is measured by counting signals which are produced by the transporting motion and the time interval of which corresponds to the passage along certain equally long distances, the start and end of counting being governed by the bright and dark signals of photocells and the counted signals being compared with the desired value of the number corresponding to the measured distance.

According to the method of the invention, one cannot only measure the length of the bases at predetermined distances from the conveying plane which is a criterion for the correct base formation but for testing the symmetric base formation one can also measure the distances which indicate possible offsetting of the folded edges of the corner tucks of the bases and which are disposed between, as viewed in the conveying direction, points of the two outer folded edges of a corner tuck that lie on both sides of the conveying plane and at equal distances therefrom.

An apparatus for performing the method of the invention comprising photocells for scanning the base folds is characterised according to the invention in that a counter is provided which is started and stopped by signal changes produced as a result of darkening and illuminating the photocells and which is connected to an adjustable desired value emitter so that the latter gives a fault-free signal to a bistable trigger stage (flip-flop), which is set back at the start of counting, and forms an error signal actuating an ejecting deflector in the absence of the fault-free signal.

Desirably, photocells for length measurement are disposed symmetrically to the conveying plane of the tube sections.

For testing the correct formation of the corner tucks, photocells are preferably arranged at the same spacing from the conveying plane in a plane perpendicular thereto, one of these starting the counter and the other stopping it. By means of this arrangement one can measure the distances indicating offsetting of the folded edges of the base corner tucks.

In a further development of the invention, for the purpose of localising the errors one can associate the error locations with bistable trigger stages which actuate relays or other error indicators. Further, special counters may be provided which indicate the size of the detected errors.

Thus, the apparatus according to the invention permits the following distances to be measured to detect the defectiveness or correctness of the bases:

1. Mutual offsetting of the two leading side edges of the bases that bound the corner tucks, are normally perpendicular to each other and change the photocells from light to dark,
2. Mutual offsetting of the trailing side edges of the bases that change the photocells from dark to light, and
3. The length of the bases measured from the leading to the trailing bounding edge, namely at the upper as well as the lower edges bounding the sides or diagonally from the leading upper to the trailing lower bounding edge of the corner tucks and conversely.

Examples of the invention will now be described in more detail with reference to the drawing, in which.

Figure 1:
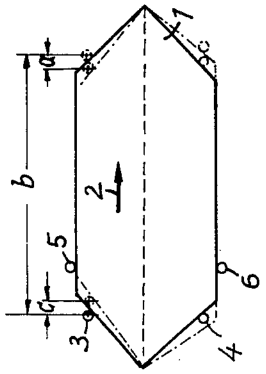
FIG. 1 is a side view of a sack with vertically erected base and photocells disposed to both sides of the conveying plane of the sack.

FIG. 1 illustrates a sack 1 fed horizontally in the direction of the arrow 2, with a finished vertically erected base of which the shape is scanned by photocells 3, 4 and 5, 6 which are directed towards the plane formed by the base and which are activated over an area substantially corresponding to the size of the base rectangle by means of a cam plate (not shown) which is driven by the machine at the same speed as the machine.

Figure 2:
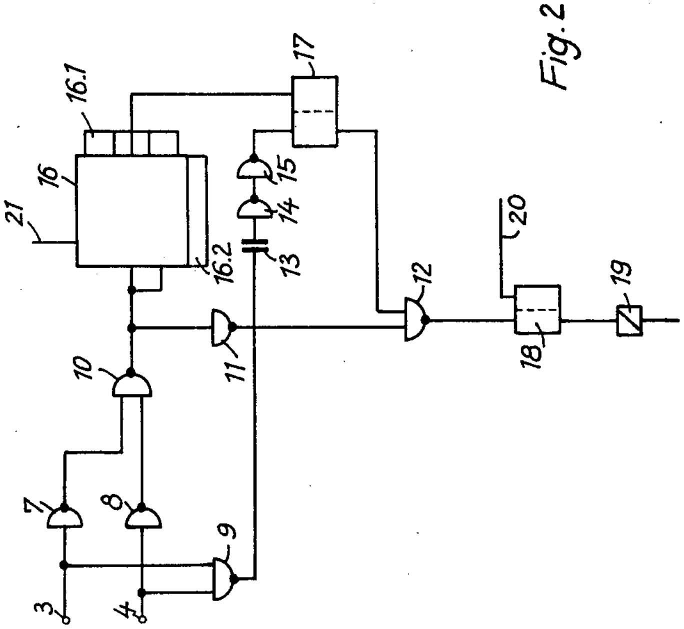
FIG. 2 shows a circuit for determining the dimension b in FIG. 1.
Figure 3:
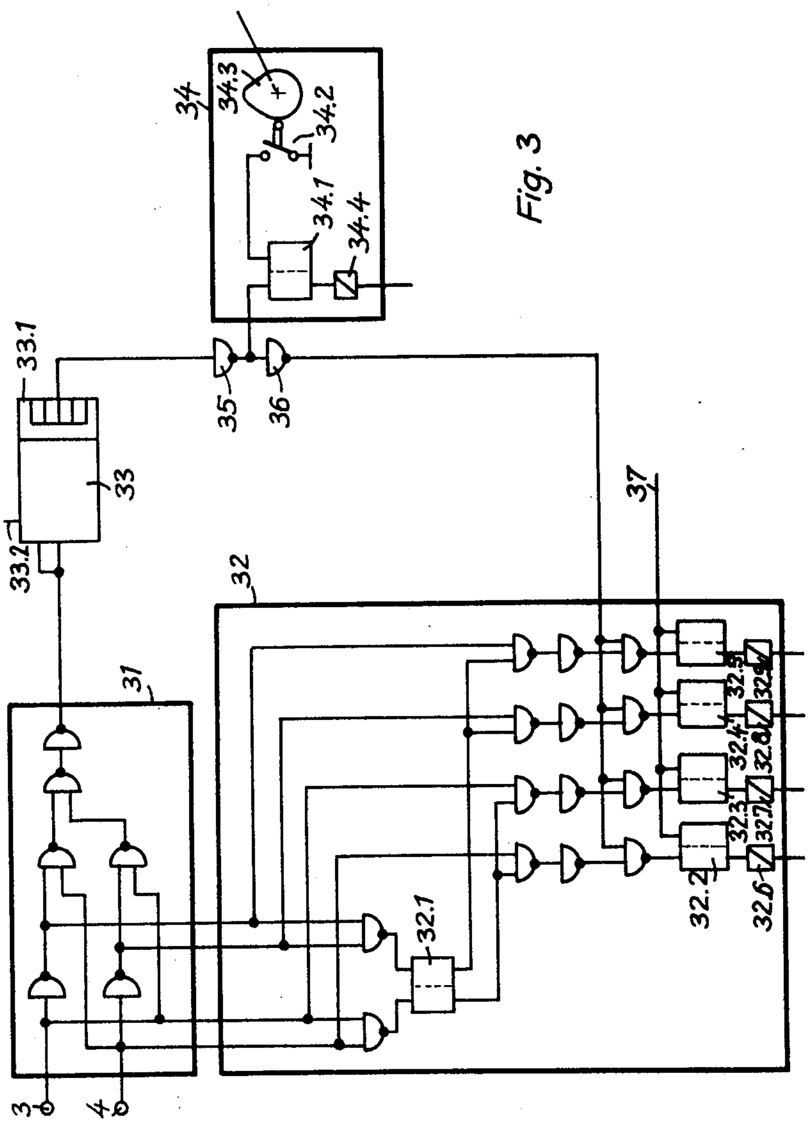
FIG. 3 shows a circuit for determining the dimensions a and c in FIG. 1.
Figure 4:
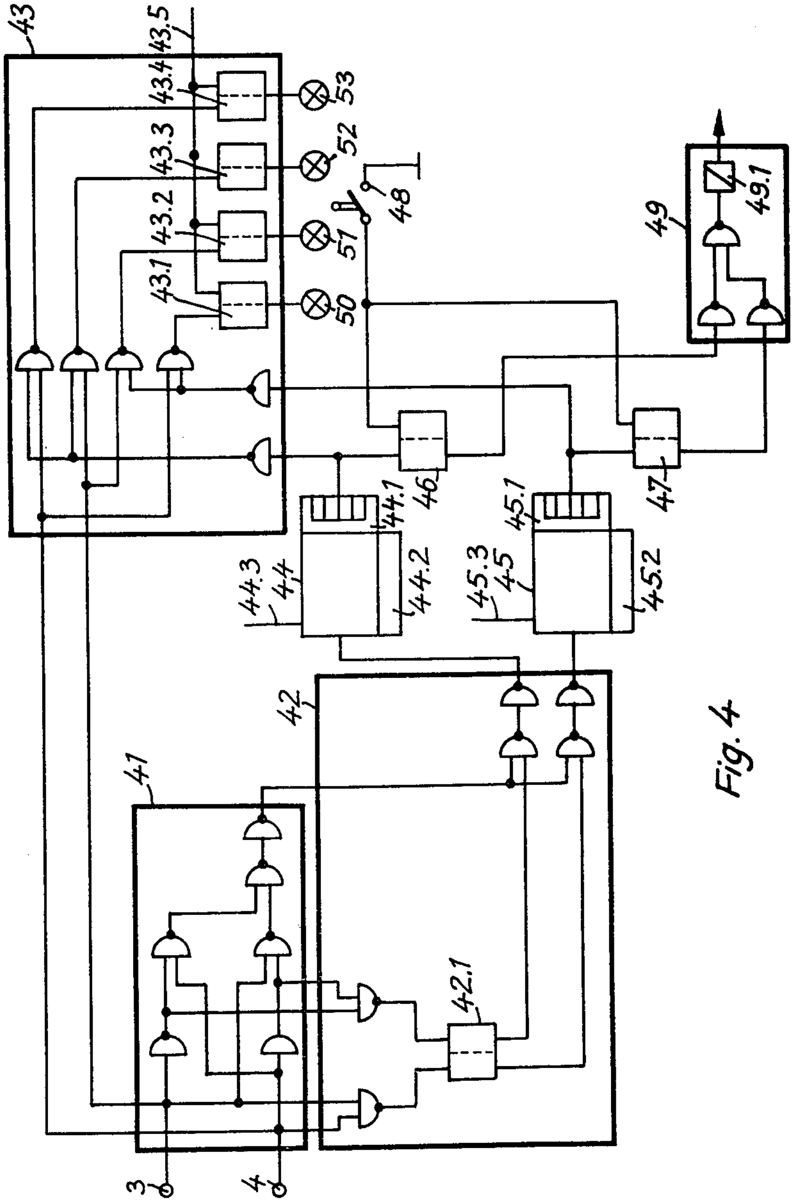

The photocells 4, 3 are connected with a circuit according to FIG. 2 as well as with a circuit shown in FIG. 3 or 4. By means of the circuit of FIG. 2, one tests the dimension b in FIG. 1 or determines its value that is the length measurement of the base at the level of the photocells 3 or 4. By means of the circuits according to FIG. 3 or 4, one tests the dimensions a and c or determines their values. These are the tolerances occurring at the base of the edges of the corner tucks or their mutual offsetting at the level of the photocells 3 or 4. The circuit shown in FIG. 3 does not have a numerical display and therefore constitutes a mere test.

In the circuit according to FIG. 4, numerical values are given for the dimensions a and c and the locations of the errors are also given by lamps.

According to the circuit of FIG. 2, the outlets of the photocells 3, 4 are on the one hand connected to the inverters 7, 8 consisting of integrated circuits and on the other hand to the NAND element 9 which likewise consists of an integrated circuit. The outlets of the inverters 7, 8 are connected to the inlet of the NAND element 10.

The outlet of the NAND element 9 is connected to the flip-flop 17 in the form of a bistable trigger stage by way of a condenser 13 and the inverters 14, 15. The outlet of the NAND element 10 is connected to a counter 16 having a pre-selector 16.1 for setting a desired number and an indicator 16.2 for the summated pulses. The outlet of the counter 16 is likewise connected to the flip-flop 17. The outlet of the NAND element 10 leads by way of the inverter 11 and the NAND element 12 to the flip-flop 18 which can be extinguished over a line 20 from a command coming from the machine. The flip-flip 18 is connected to a relay 19 which may be connected to a sorting deflector and/or a display indicator.

The counter 16 is fed by way of a line 21 with pulses at a frequency which is linearly proportional to the machine speed. These pulses form a measurement of the conveying distances traversed at machine speed. If the number of pulses between darkening of the photocells 3 and 4 during passage of the base and illumination thereof after its passage is smaller than the predetermined pulse number, the error signal is released. The flip-flop 17 is set by way of the condenser 13 and inverters 14, 15 when the leading edge of the sack darkens the photocells 3 and 4. To set the flip-flop 17 a short pulse is required which is formed by the condenser 13. The tooth shape of the pulse delivered by the condenser 13 is transformed to a rectangular pulse by the inverter 14 and has its phase turned by the inverter 15 for correct coupling to the flip-flop 17. At the same time as setting the flip-flop 17, the counter 16 starts. The counter 16 must have reached the set number and set back the flip-flop 17 with its output pulse before the photocells 3, 4 become bright again after the base has passed. If this is not the case, the output signal of the flip-flop 17 is transmitted to the flip-flop 18 whereby the error signal is formed and transmitted to the relay 19 by which a light display (not shown) is actuated and the sorting deflector of the machine is activated to eject the defective sack. In addition, the number of pulses corresponding to the base dimension b can be read from the display 16.2. At a high machine speed it will be advisable to store the value given by the display 16.2 because otherwise the large sequence of sacks will make insufficient time available to read the display which would be cancelled by the display of the next value.

As already mentioned, the circuit shown in FIG. 3 serves to test the formation of the corner tucks and has no display. It consists primarily of intermediate circuits 31, 32, a counter 33 with a pulse pre-selector 33.1 and a defect storing and extinguishing device 34.

The illustrated intermediate circuit 31 comprises three NAND elements and three inverters which are interlinked in the manner shown in FIG. 3 and has five outlets. One of these leads to the counter 33 and the other four lead to the intermediate circuit 32. The latter contains fourteen inverters and NAND elements and five flip-flops 32.1 to 32.5 as well as four relays 32.6 to 32.9. The intermediate circuit 32 is connected to the outlet of the counter 33. In addition it is connected by a line 37 to an emitter (not shown) for the extinguishing signal that leads to the flip-flops 32.2 to 32.5.

The error storing and extinguishing device 34 comprises a flip-flip 34.1 of which the inlet line is tapped from the junction between the inverters 35 and 36. The second input of the flip-flop 34.1 is connected to an extinguishing contact 34.2 which is actuated by a cam 34.3 driven by the machine. The outlet of the flip-flop 34.1 is connected to a relay 34.4 of which the outlet is connected to an ejecting deflector or other activating means (not shown).

Lamps (not shown) for indicating the possible locations of errors are connected to the outlets of the relays 32.6 to 32.9. As does the counter 16 in FIG. 2, the counter 33 receives pulses at a frequency which is linearly proportional to the machine speed.

The intermediate circuit 31 serves to prepare the pulses which come from the photocells 3, 4 and which signal the brightening and darkening of the photocells. The counter 33 is controlled by the outlet of the intermediate circuit 31.

By means of the intermediate circuit 32, any errors that occur are allocated to their error locations so that illumination of the corresponding lamps readily enables one to determine the group of machines responsible for the error.

The circuit shown in FIG. 4 has a value display for the dimensions a and c and consists of the intermediate circuits 41 to 43 and 49, counters 44, 45, flip-flops 46, 47 and an extinguishing contact 48.

The intermediate circuit 41 is of similar construction to the intermediate circuit 31 and serves to prepare the pulses which come from the photocells 3, 4 and signal brightening and darkening of the photocells and likewise comprises six inverters and NAND elements. The intermediate circuit 41 has seven outlets which lead to the intermediate circuits 42 and 43 in the illustrated manner. The intermediate circuit 42 with four inverters, two NAND elements and flip-flops 42.1 has two outlets by which the counters 44, 45 are controlled. The counters 44, 45 are equipped with preselectors 44.1, 45.1 and displays 44.2, 45.2 for the summated pulses. By way of lines 44.3 and 45.3 the counters 44, 45 are fed with pulses at a frequency linearly proportional to the machine speed. The counter 44 starts, say, upon darkening of one photocell 3, 4 during passage of the base of a sack and stops upon darkening of the second photocell. If the summated pulses are larger than, for example, the number of pulses fed to the pre-selector 44.1, an appropriate signal is given by the counter 44 to the flip-flop 46 and to the intermediate circuit 43. The counter 45 is started when the first of the photocells 3, 4 changes from 'dark' to 'bright' and is stopped when the other photocell changes over. The counter 44 in this example counts the value of the dimension a and the counter 45 the value of the dimension c. The outlets of the flip-flops 46, 47 are connected to the intermediate circuit 49 which consists of two inverters, one NAND element and one relay 49.1 of which the outlet is connected to a sorting deflector (not shown) or an activating device therefor so that defective pieces are eliminated from the production line of the machine.

In the intermediate circuit 43, the incoming pulses are prepared by inverters and NAND elements and four storers 43.1 to 43.4 according to their error locations which are displayed by lamps 50 to 53. The storers 43.1 to 43.4 are extinguished by way of a line 43.5 coming from the machine.

Errors in the dimensions a and c are displayed by the displays 44.2 and 45.2 at twice the size even if the wrongly turned-in corners of the base have folded edges which are perpendicular to each other. This provides an extraordinarily good representation of the occurring errors.

The photocells 5, 6 must always remain 'bright'; otherwise one is faced with the case where the base has been incorrectly closed.

Figure 5:
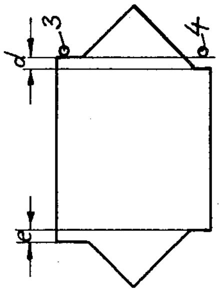
FIG. 4 shows a circuit for determining the dimensions a and c with a dimension display and FIG. 5 is a representation corresponding to FIG. 1 where the base is still open.

To test open bases with incisions which are not offset, the procedure is the same as described above. With open bases having offset incisions in accordance with FIG. 5 with a base flap projecting by the dimensions d and e, the dimensions d and e have to be scanned. For this purpose, one proceeds in the same way as when testing the dimension b in that between darkening of the photocell 4 for the dimension d and brightening of the photocell 4 and the photocell 6 for the dimension e there is in each case provided a counter of which the set numerical values correspond to the dimensions d and e.

I claim:

1. A method of testing the base folds of bases formed on tube sections during the production of sacks or bags, comprising the steps of:

providing a plurality of photocells;

transporting the tube sections in a transverse position past said photocells;

for controlling parts of one of the leading edges, the trailing edges and the folded edges of the bases, placing said one of the leading edges, trailing edges and folded edges of the bases perpendicular to the tube sections;

measuring, via said plurality of photocells, the length of the bases at a predetermined spacing from the tube section parallel thereto;

comparing the measured length with a desired value thereof; and eliminating the appropriate sack if the measurement differs from the desired value.

2. The method according to claim 1, comprising the additional step, for testing the symmetric base formation, of measuring the distances which indicate offsetting of the folded edges of corner tucks of the bases and which are disposed between, as viewed in the conveying direction, points of the two outer folded edges of a corner tuck that lie on both sides of the conveying plane and at equal distances therefrom.

3. The method according to any one of claims 1 and 2, comprising the additional steps of measuring the length by counting signals which are produced by the transporting motion, the time interval of which corresponds to the passage along certain equally long distances, the start and end of counting being governed by the bright and dark signals of said photocells, comparing the counted signals with a desired value of a number corresponding to the measured distance, and eliminating the appropriate sack or bag if the count differs from the desired value.

4. The method according to any one of claims 1 and 2, comprising the additional steps of providing a counter, starting and stopping said counter by signal changes produced as a result of darkening and illuminating of the photocells, connecting said counter to an adjustable desired value emitter so that the counter gives a fault-free signal, providing a bistable trigger stage which is set back at the start of counting, and providing said fault-free signal to said bistable trigger stage so that said bistable trigger stage forms an error signal actuating an ejecting deflector in the absence of the fault-free signal.

5. The method according to claim 4, wherein the step of providing said plurality of photocells comprises disposing photocells for length measurement symmetrically with respect to the conveying plane of the tube sections.

6. The method according to claim 2, comprising the additional step, for testing the correct formation of the corner tucks, of arranging at least two photocells at the same spacing from the conveying plane in a plane perpendicular thereto, one of said at least two photocells starting the counter and the other of said at least two photocells stopping the counter.

7. The method according to any one of claims 5 and 6, comprising the additional step, for localising errors, of providing bistable trigger stages and error indicators actuated thereby, said error indicators corresponding to error locations.

8. The method according to claim 3, comprising the additional steps of providing a counter, starting and stopping said counter by signal changes produced as a result of darkening and illuminating of the photocells, connecting said counter to an adjustable desired value emitter so that the counter gives a fault-free signal, providing a bistable trigger stage which is set back at the start of counting, and providing said fault-free signal to said bistable trigger stage so that said bistable trigger stage forms an error signal actuating an ejecting deflector in the absence of the fault-free signal.

9. The method according to claim 4, comprising the additional step, for localising errors, of providing bistable trigger stages and error indicators actuated thereby, said error indicators corresponding to error locations.

10. An apparatus for testing the base folds of bases formed on tube sections during the production of sacks or bags, comprising:

a plurality of photocells;

means for transporting the tube sections in a transverse position past said photocells;

means for controlling parts of one of the leading edges, the trailing edges and the folded edges of the bases;

means for placing said one of the leading edges, trailing edges and folded edges of the bases perpendicular to the tube sections;

means for measuring, via said plurality of photocells, the length of the bases at a predetermined spacing from the tube section parallel thereto;

means for comparing the measured length with a desired value thereof; and means for eliminating the appropriate sack if the measurement differs from the desired value.

11. The apparatus according to claim 10, further comprising means for measuring the distances which indicate offsetting of the folded edges of corner tucks of the bases and which are disposed between, as viewed in the conveying direction, points of the two outer folded edges of a corner tuck that lie on both sides of the conveying plane and at equal distances therefrom, whereby to test the symmetric base formation.

12. The apparatus according to any one of claims 10 and 11, further comprising means for counting signals produced by the transporting motion provided by said means for transporting the tube sections so as to measure the length thereof, the time interval of counting corresponding to the passage along certain equally long distances, means for controlling the start and end of counting in accordance with the bright and dark signals of said photocells, means for comparing the counted signals with a desired value of a number corresponding to the measured distance, and means for eliminating the appropriate sack or bag if the count differs from the desired value.

13. The apparatus according to any one of claims 10 and 11, further comprising a counter and means for starting and stopping said counter by signal changes produced as a result of darkening and illuminating of the photocells, said counter being connected to an adjustable desired value emitter so that the counter gives a fault-free signal, a bistable trigger stage responsive to the start of counting for being set back to an initial state, and means for providing said fault-free signal to said bistable trigger stage so that said bistable trigger stage forms an error signal actuating an ejecting deflector in the absence of said fault-free signal.

14. The apparatus according to claim 13, wherein said photocells are disposed for length measurement symmetrically with respect to the conveying plane of the tube sections.

15. The apparatus according to claim 11, wherein said at least two of said photocells are arranged at the same spacing from the conveying plane in a plane perpendicular thereto, one of said two photocells starting the counter and the other of said two photocells stopping the counter, whereby to test the correct formation of the corner tucks of the sacks or bags.

16. The apparatus according to any one of claims 14 and 15, further comprising bistable trigger stages and error indicators actuated thereby, said error indicators corresponding to error locations in said sacks or bags, whereby to localise said errors therein.

17. An apparatus for testing the base folds of bases formed on tube sections during the production of sacks or bags, comprising:

photocell means for issuing light signals when illuminated and dark signals when not illuminated;

counter means for counting through a series of count values;

means for starting said counter means in response to reception of said light signals from said photocell means, and for stopping said counter means in response to reception of said dark signals from said photocell means;

means for providing a predetermined value for said count values of said counter means; and error means connected to said counter means and responsive to said count value being less than said predetermined value when said counter means is stopped for issuing an error signal.

18. The apparatus according to claim 17, wherein said error means comprises a flip-flop having a set input connected to said photocell means so as to be set when said dark signals are issued by said photocell means, and a reset input connected to said counter means for being reset when said count value reaches said predetermined value.

19. The apparatus according to claim 18, wherein said flip flop has an output, further comprising AND gate means having an enabling input connected to said photocell means for receiving said light signals therefrom, and having a further input connected to said flip flop for receiving said output thereof, said AND gate means being responsive to said light signals for passing said output of said flip flop as said error signal.

20. An apparatus for testing corner tucks of tube sections during the production of sacks or bags, comprising:

photocell means for issuing light signals when illuminated and dark signals when not illuminated;

counter means for counting through a series of count values;

first intermediate circuit means responsive to said light and dark signals for starting and stopping said counter means;

second intermediate circuit means responsive to said light and dark signals for identifying the location of errors in said corner tucks of said tube sections during the production of said sacks or bags;

means for providing a predetermined value; and means responsive to said count values reaching said predetermined value prior to stopping of said counter means for issuing an ejection signal, whereby to eject said tube section.

21. An apparatus for testing corner tucks of tube sections during the production of sacks or bags, comprising:

first and second photocells for issuing a light signal when illuminated and a dark signal when not illuminated;

first and second counters for counting through a series of count values;

means for starting said first counter when said first photocell issues said dark signal, and for stopping said first counter when said second photocell issues said dark signal;

means for providing a first predetermined value;

means responsive to said count values of said first counter reaching said first predetermined value for issuing a first error signal corresponding to an error in a first dimension of said tube sections;

means for starting said second counter when said first photocell issues said light signal, and for stopping said second counter when said second photocell issues said light signal;

means for providing a second predetermined value; and means responsive to said count values of said second counter reaching said predetermined value for issuing a second error signal corresponding to an error in a second dimension of said tube sections.

22. The apparatus according to claim 21, wherein said means for issuing said first error signal comprises a comparator circuit and a flip-flop, said comparator circuit comparing said count values of said first counter to said first predetermined value, and setting said flip-flop when said count values of said first counter reach said first predetermined value.

23. The apparatus according to claim 21, wherein said means for issuing said second error signal comprises a comparator circuit and a flip-flop, said comparator circuit comparing said count values of said second counter to said second predetermined value, and setting said flip-flop when said count values of said second counter reach said second predetermined value.

* * * * *